March 28, 1961 L. L. FRY 2,976,936
VEHICLES FOR CLEANING BEACH SANDS
Filed Aug. 11, 1959 2 Sheets-Sheet 2
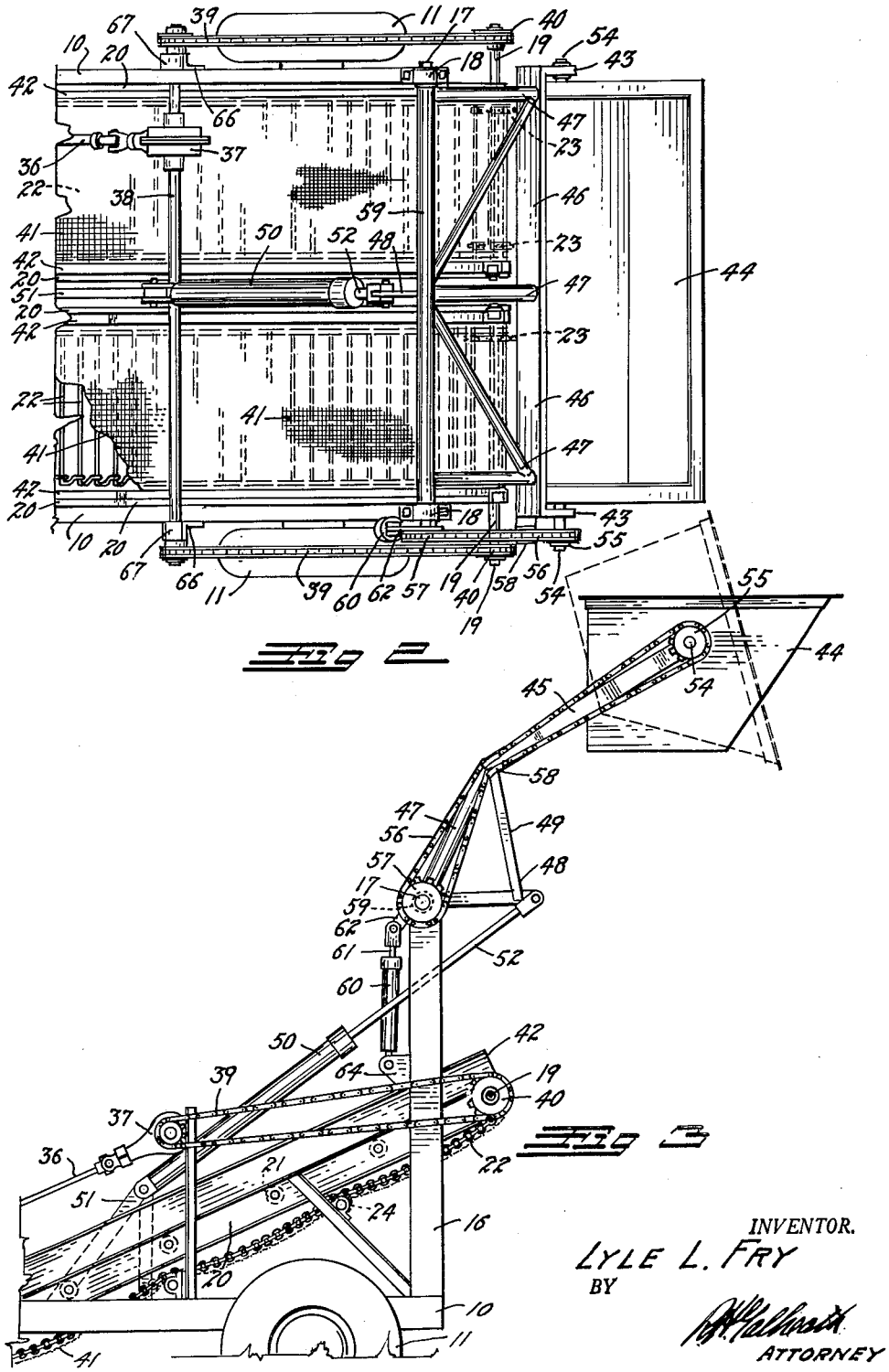
INVENTOR.
LYLE L. FRY
BY
ATTORNEY

United States Patent Office 2,976,936
Patented Mar. 28, 1961

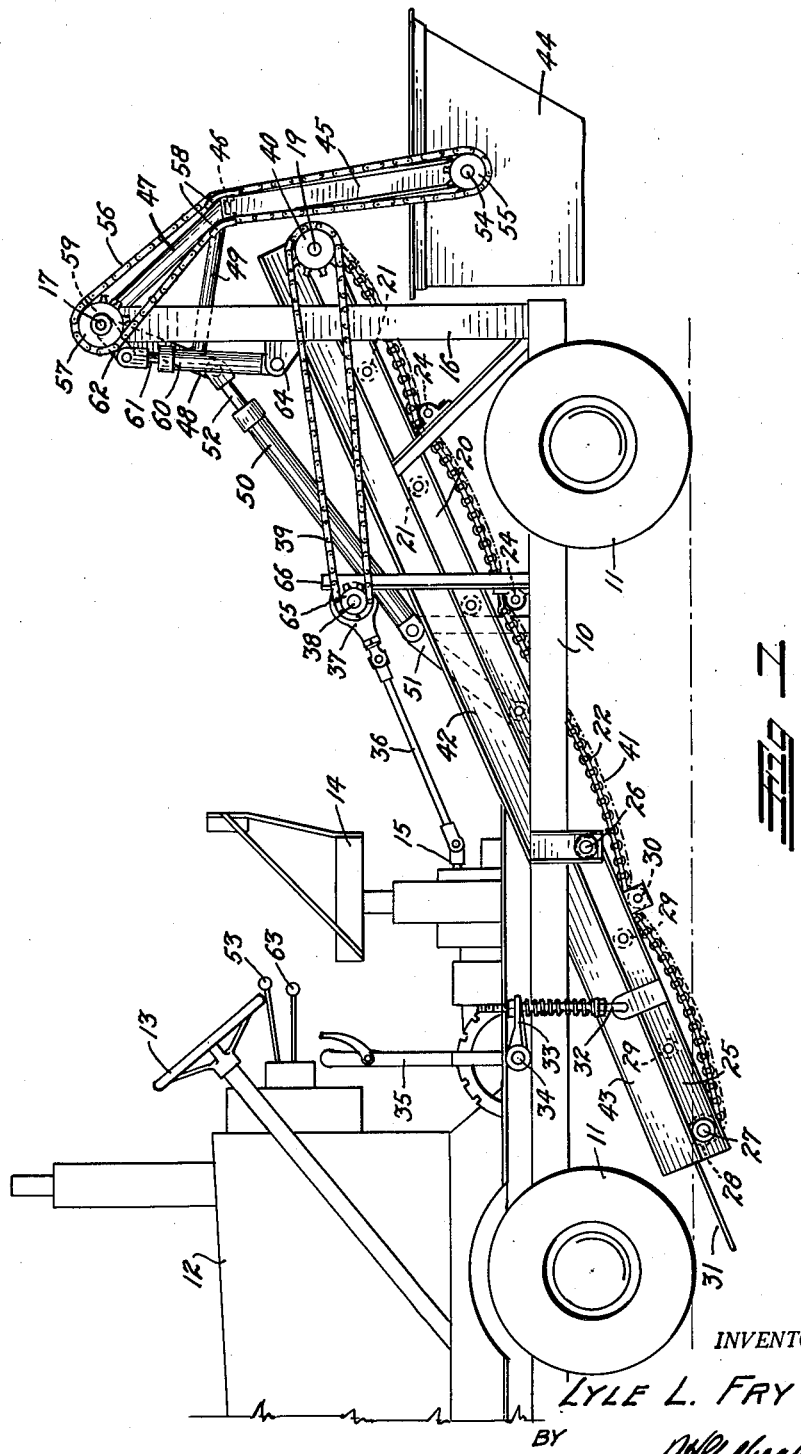

2,976,936
VEHICLES FOR CLEANING BEACH SANDS

Lyle L. Fry, Gering, Nebr., assignor to Lockwood Graders, a corporation of Nebraska Filed Aug. 11, 1959, Ser. No. 833,112

1 Claim. (Cl. 171—126)

This invention relates to what will be herein designated as a "beachcomber," that is, a device for removing the debris from the sand of bathing beaches. The sands of large public bathing beaches accumulate all types of lost and discarded material including scrap paper, scrap food, cans, bottle caps, broken bottles, and the like. To clean such a beach by hand presents an exceedingly expensive labor problem.

The principal object of this invention is to provide a self-propelled beach cleaning machine which can be driven along a beach by a single operator and which will elevate the sand from the beach, screen the debris from the sand, return the sand and retain the debris.

Another object of the invention is to provide a beachcomber with a debris collection bucket which can be quickly and easily mechanically elevated by the operator to dump the accumulated refuse into a refuse truck.

A further object is to so construct the machine that it will be entirely power operated yet will be economical to construct and economical to operate.

Other objects and advantages reside in the detail construction of the invention, which is designed for simplicity, economy, and efficiency. These will become more apparent from the following description.

In the following detailed description of the invention, reference is had to the accompanying drawings which forms a part hereof. Like numerals refer to like parts in all views of the drawings and throughout the description.

In the drawing:

Fig. 1 is a side elevational view of the improved beachcomber in the working position;

Fig. 2 is a plan view of the rear portion thereof;

Fig. 3 is a side elevational view of the rear portion illustrating a refuse collector as employed in the improved beachcomber in the elevated dumping position.

The improved beachcomber employs an automotive chassis 10, supported upon suitable ground wheels 11, and provided with a conventional propelling motor of the power take-off type contained within a hood 12, a steering wheel 13, and an operator's seat 14.

A vertical post 16 arises from each rear corner of the chassis 10 to support a horizontal shaft 17 above the rear of the chassis 10 in suitable bearings 18. Two conveyor frames, each comprising two parallel, spaced-apart side channel irons 20, are supported by and extend forwardly and downwardly in a common inclined plane from the posts 16 to the chassis 10. A plurality of conveyor supporting rollers 21 are rotatably mounted in each conveyor frame to support the upper reaches of two conveyor chains 22 of the bar type.

The two conveyor chains 22 are trained about head sprockets 23 mounted upon upper sprocket shafts 19 supported in suitable bearings at the upper extremities of the two conveyor frames. The upper reaches of the chains 22 extend downwardly over the supporting rollers 21. The lower reaches of the conveyor chains 22 are supported upon idler rollers 24 rotatably mounted below each of the chains.

A hinged conveyor frame 25 is hingedly mounted below the chassis 10 upon a transversely extending hinge shaft 26. A foot sprocket shaft 27 is rotatably mounted across the lower extremity of the hinged frame 25 to carry terminal sprockets 28 about which the lower extremities of the two conveyor chains 22 are trained. The hinged frame 25 is also provided with chain supporting rollers 29, similar to the rollers 21 previously described, so that the upper reaches of the two chains are supported throughout their lengths upon the supporting rollers 21 and 29. The lower reaches are supported on the idler roller 24 and upon idler rollers 30 mounted on and movable with the hinged frame 25.

A sand scraper blade 31 is mounted on and extends forwardly and downwardly from the hinged frame 25. The forward extremity of the frame 25, the scraper blade 31, and the lower extremities of the conveyor chains are supported by and can be raised and lowered through the medium of hanger rods 32 extending from hanger levers 33 mounted on a hanger shaft 34 which may be rotated in any desired manner, such as through the medium of a depth control lever 35.

The bar chains may be driven in any desired manner. As illustrated, they are driven from a power take-off 15 from the automotive motor through the medium of a universal shaft 36, a gear set 37, and a sprocket shaft 38. Power is transmitted from the sprocket shaft 38, through the medium of endless drive chains 39, to driven sprockets 40 on the extremities of the upper sprocket shafts 19.

Both of the conveyor chains 22 are covered by means of flexible mesh screens 41 throughout their lengths and widths. The screens 41 are secured to the bars of the conveyor chains in any suitable manner. Side boards 42 are mounted on each of the conveyor side frame members 20 at each side of each chain to retain material thereon, and similar side boards 43 are mounted on the hinged frame 25 at each side of each conveyor for a similar purpose.

It can be seen that if the chassis 10 is driven forwardly with the scraper blade 31 lowered below the beach surface, as shown in Fig. 1, the sand will travel upwardly on the blade 31 and onto the screens 41 of the two traveling bar conveyor chains 22. The sand will sift through the screens and return to the beach. The refuse, however, will be retained upon the two screens and carried upwardly upon the upper reaches of the conveyors and discharged rearwardly over the head sprockets 23 into a dump bucket 44.

The dump bucket 44 is rotatably supported between two side arms 45 extending rigidly from the extremities of a cross frame member 46. The cross frame member 46 is maintained in rigid, parallel spaced relation to a hinge tube 59 rotatably surrounding the horizontal shaft 17 by means of tubular frame members 47 which are welded at their extremities to the cross frame member 46 and the hinge tube 59. A lever arm 48 is mounted on, and extends radially from, the hinge tube 59 and is rigidly braced from the cross frame member 46 by means of suitable bracing 49.

A relatively long stroke hydraulic cylinder 50 is mounted on a bracket member 51 extending upwardly from the chassis 10 intermediate the two bar conveyors so as to acutate a hydraulic plunger 52 connected with the lever arm 48. The flow of hydraulic fluid to the cylinder 50 is controlled through a conventional hydraulic valve controlled by a valve lever 53 within reach of the operator.

It can be seen that when hydraulic fluid is admitted to the cylinder 50, the plunger 52 will be forced upwardly and rearwardly so as to cause the lever arm 48 to rotate the hinge tube 59 and the entire bucket supporting frame assembly consisting of the members 45, 47, 48 and 49 so as to swing the dump bucket 44 upwardly to an elevated position as shown in solid line Fig. 3.

The dump bucket 44 is pivoted between the lower extremities of the side arms 45 on pivot studs 54 so that it may be rotated. The arcuate movements of the bucket are controlled by means of a bucket sprocket 55 mounted on one of the pivot studs 54 at one end of the bucket about which an endless control chain 56 extends from a control sprocket 57 on the horizontal shaft 17 at the axis of the hinge tube 59. The chain 56 is trained about guide slides 58 so that it will follow the contour of the supporting elements. The control sprocket 57 is rotated to control the angular position of the bucket 44 through the medium of a second hydraulic cylinder 60, the plunger 61 of which, is connected to a lever arm 62 mounted on the central sprocket 57. The flow of hydraulic fluid to the cylinder 60 is controlled in any desired manner, such as by means of a second valve control lever 63 within reach of the operator.

Thus, when it is desired to dump or empty the dump bucket 44, the first plunger 52 is hydraulically actuated to swing the entire bucket supporting structure rearwardly and upwardly to the solid line position of Fig. 3. The second hydraulic plunger 61 is then hydraulically operated to rotate the control sprocket 57 to cause the control chain 56 to rotate the bucket to the broken line position of Fig. 3 to dump the contents into a waiting truck or other receptacle.

While a specific form of the improvement has been described and illustrated herein, it is to be understood that the same may be varied within the scope of the appended claim, without departing from the spirit of the invention.

Having thus described the invention what is claimed and desired secured by Letters Patent is:

Means for receiving material from the discharge extremity of an inclined elevating conveyor and raising the received material to an elevated position above said conveyor, thence dumping the elevated material comprising: a substantially vertical post positioned at each side of said discharge extremity; a horizontal shaft rotatably supported between said posts and over said extremity; a hinge tube rotatably surrounding said shaft; frame members welded to said hinge tube at their one extremities and extending normally rearwardly and downwardly from said hinge tube at their free extremities; a material receiving bucket; pivot studs mounted on said bucket and rotatably suspending the latter between the free extremities of said frame members; a driven chain sprocket mounted on one of said pivot studs; a drive chain sprocket mounted on said horizontal shaft; an endless sprocket chain trained about said sprockets; and a first hydraulic means mounted on one of said posts and connected with and arranged to rotate said shaft so as to rotate said bucket through the medium of said chain; a lever arm fixedly projecting from said hinge tube; and a second hydraulic means connected to said lever for rotating said hinge tube about said shaft to swing said frame members and said chain about the axis of said shaft to raise and lower said bucket.

References Cited in the file of this patent

UNITED STATES PATENTS

| | | |
|---|---|---|
| 1,563,340 | Christenson | Dec. 1, 1925 |
| 2,625,781 | Tateyama | Jan. 20, 1953 |
| 2,657,815 | Collins | Nov. 3, 1953 |
| 2,706,623 | Styes | Apr. 19, 1955 |
| 2,729,350 | Wilson | Jan. 3, 1956 |